United States Patent [19]

Porath

[11] Patent Number: 4,701,500
[45] Date of Patent: Oct. 20, 1987

[54] METAL ION BINDING PRODUCT TO INHIBIT BACTERIAL GROWTH FOR THE IMMOBILIZATION AND PURIFICATION OF BIOPOLYMERS AND THE LIKE

[76] Inventor: Jerker Porath, Bodalsvägen 4A, S-18136 Lidingö, Sweden

[21] Appl. No.: 729,345

[22] Filed: Apr. 30, 1985

[30] Foreign Application Priority Data

May 10, 1984 [SE] Sweden ............................ 8402531

[51] Int. Cl.$^4$ .............................................. C08C 19/22
[52] U.S. Cl. .................................... 525/380; 525/157;
525/327.3; 527/300; 527/305; 527/312; 536/3;
536/30; 536/45; 536/52; 556/411; 556/413
[58] Field of Search ...................... 527/312, 300, 305;
536/3, 30, 45, 52; 525/157, 327.3, 380; 556/411, 413

[56] References Cited

U.S. PATENT DOCUMENTS 4,423,158 12/1983 Porath ................................... 521/32
4,530,963 7/1985 De Voe et al. ..................... 525/54.1

FOREIGN PATENT DOCUMENTS 0104346 4/1984 European Pat. Off. .

Primary Examiner—Joseph L. Schofer
Assistant Examiner—J. M. Reddick
Attorney, Agent, or Firm—Young & Thompson

[57] ABSTRACT

Heavy metals can be fixed to solid carriers to which an α-amino- or an α-iminohydroxamate ligand has been covalently bound. The ligand can have the structural formula

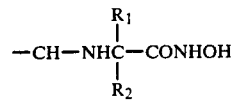

wherein $R_1$ and $R_2$ represent H or an alkyl, or may be a compound of two or more hydroxamate substituents. The carrier can be formed of polysaccharides, polygalactanes, polyacrylates or silica dioxide. The adsorbent is prepared by an α-aminohydroxamate in an aqueous solution having a pH value of 4–9 being brought into contact with an aldehyde derivative of a carrier, followed by reduction with sodiumborohydride or sodiumcyanoborohydride.

5 Claims, No Drawings

METAL ION BINDING PRODUCT TO INHIBIT BACTERIAL GROWTH FOR THE IMMOBILIZATION AND PURIFICATION OF BIOPOLYMERS AND THE LIKE

Heavy metals exhibit affinity for a plurality of biological substances such as proteins, nucleic acids etc., from which follow their biological effects. Certain heavy metals constitute essential chemical elements in small amounts, while being harmful at higher concentrations. Other heavy metals such as mercury, cadmium and thorium are harmful at all concentrations. By attaching heavy metal ions to metal binding carriers it is possible to remove the free metal ions from a solution. Such attachment can be carried out on a conventional type of ion exchanger. A still more efficient attachment is obtained with the use of strongly chelate forming ligands fixed to the solid carrier. The same principles of binding metal apply to soluble polymers as well. If it is then also desired to separate bound metal ions from the surrounding solution, more exhaustive separation procedures must be utilized such as precipitation or dialysis.

Heavy metal ions which are strongly fixed to solid carriers can be used as adsorption agents for amino acids, peptides, proteins, nucleotides, nucleic acids and other substances forming soluble metal complexes. Metal ions belonging to the first series of transition elements are of specific interest, especially $Fe^{3+}$, $Co^{2+}$, $Ni^{2+}$, $Cu^{2+}$ but also $Zn^{2+}$, $Cd^{2+}$, $Hg^{2+}$ and $Tl^{3+}$.

The present invention relates to an adsorbent which is particularly useful for the aforementioned metals. Ligands containing α-amino hydroxamic acid (or a corresponding hydroxamate), —NH—CH$_2$—CONHOH, are coupled to hydrophilic carriers of different types.

A simple embodiment of the invvention comprises ligands covalently fixed to the carrier designated by the symbol ⓟ:

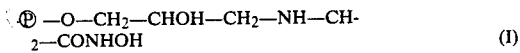

if the attachment was carried out with the use of epichlorohydrin from a hydroxyl in the polymer, or

if attached from a —CH$_2$—OH group with epoxides, and

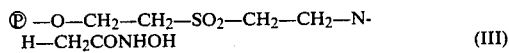

if attached with the use of divinyl sulphone.

Binding can also be made in other ways, for example with cyanogen bromide, whereby inter alia ligands of the isourea type will be obtained:

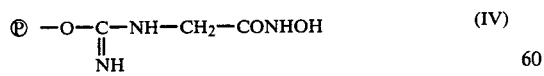

In accordance with the invention, there are further methods of producing adsorbents, as will be illustrated in Example 3. Into a carrier in the form of a solid phase or a polymer there is first introduced aldehyde groups which are then allowed to react with amino hydroxamate and are finally subjected to reduction. An amino group-containing carrier can be treated in aqueous solution having a pH value preferably in the range of 4–9 and a large excess of dialdehyde such as glyoxalic or glutaric aldehyde, forming in this way

wherein n=0 or 1, and R represents an alkyl group, an alkylene group or an aromatic group.

The intermediate product with the formula (V) is relieved from excess aldehyde and is then allowed to react with α-amino hydroxamate, for example glycine hydroxamate in aqueous solution, preferably in the pH range of 4–9, the ligands of the carrier to a larger or less extent being structurally transferred in accordance with the following schematized formula for the derivatized carrier:

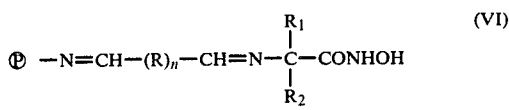

wherein R$_1$ and R$_2$ are H for the simple glycine hydroxamate derivative. R$_1$ and R$_2$ may alternatively represent alkyles and more complex substituents. By reduction with sodium borhydride or sodium cyanborhydride for example, (VI) is transferred in adsorbent according to the invention:

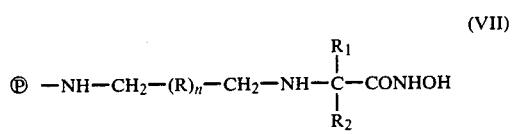

There are other methods of introducing aldehyde groups into a polymeric carrier, for example by oxidation of a primary alcohol or by oxidation of a cisdiol. Aldehyde starch can be obtained with the aid of prior art methods, for example by oxidation of starch with periodate. The aldehyde polymer is thereafter converted with α-amino hydroxamate followed by reduction as described above and illustrated in Example 4, Preparation of α-amino hydroxamate adsorbent.

Among the more complex variations of the inventive product can be included chelate adsorbent with ligands containing two or more α-amino or α-imino hydroxamate groups such as

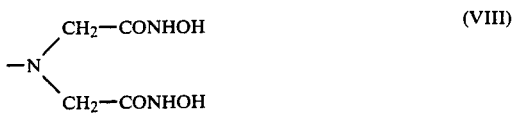

and

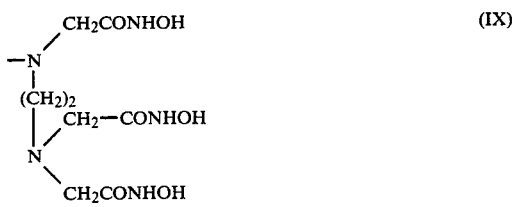

Adsorbents based on agar/agarose are particularly interesting. $Fe^{3+}$-, $Cu^{2+}$- and $Ni^{2+}$-hydroxamate agaroses are thus excellent separation products for protein purification. The same also applies for adsorbents based on polyacrylate derivatives. Silica dioxide treated with epoxy silanes constitutes the starting material for the preparation of hydroxamate adsorbent in accordance with the invention.

Hydroxamate adsorbents differ from other metal ion adsorbents in certain respects. The selectivity towards iron in relation to other metals is considerably higher than for conventional ion exchangers and also for chelate forming adsorbents of the kelone type (based on carboxy methylized amines). Accordingly, iron is strongly bound in neutral environment to agarose gels containing glycine hydroxamate (formula I), but very weakly bound to glycine agarose. Copper and nickel as well are strongly bound to glycine hydroxamate adsorbents.

Glycine hydroxamate and analogue hydroxamates in free solution produce very strong iron complexes. The efficient complex formation is due to the fact that an iron ion is able to coordinate several hydroxamate molecules. In glycine hydroxamate which is sparsely bound to a solid carrier, for example agarose or silica gel, and iron ion mainly binds at a stoichiometric ratio of 1:1. It is therefore unexpected that in said embodiment, the inventive object has appeared to be such a strong metal ion adsorbent.

Carriers substituted with amino- and imino ligands containing numerous hydroxamate groups, e.g. according to the formulas (V) and (IX), have an even stronger binding action on the metal ions. Adsorbents prepared in accordance with the invention can therefore be used to remove heavy metals of the aforementioned kind from highly diluted solvents as well. It may be of interest to especially emphasize one practical application of such a factor. After contact with a suitable amount of adsorbent according to the invention, the aqueous solution has been deprived of almost all iron and copper, and therefore no reproduction of cells can take place in the extraction or eluate. Addition of the metal ions in question will restore the capacity of a culture medium to promote the growth of cells and bacteria. It is thus possible according to the invention to easily sterilize an aqueous solution (for example liquid foodstuffs and drugs) without subjecting proteins and other sensitive substances to violent treatment.

Low molecular chelates can penetrate into cells, which may cause irreversible reactions. If the metal ions in the surrounding solution are bound to high molecular chelating polymers, they will be unable to penetrate cell membranes. In a mixture of different types of cells the metabolism is inhibited but can be made to start again after any arbitrary period of time by removing the inventive product while adding optimum amounts of essential heavy metal ions.

When depositing adsorbents according to the invention with metal ions of the above-described type, the product will obtain new adsorption properties; it is converted into an immobilized metal ion affinity adsorbent, the "IMA adsorbent". The characteristic feature of such a product is that proteins and other substances are adsorbed to various degrees in response to the affinity between certain groups exposed in the protein molecules and the metal ions fixed to the carrier. The adsorption is dependent on the environment of the metal ion. The metal ion is "tamed" by being fixed to a chelate forming agent and to the carrier. The invention thus serves as a base for a unique type of IMA adsorbents.

Immobilized amino- and imino hydroxamates according to the invention have extremely weak ionogenic properties and are therefore not particularly useful per se as ion exchange material for protein nucleic acid fractionation. When deposited with heavy metal ions, they will be transformed into a new type of anion exchangers in which the electrical charge is dependent on the metal ion. It is therefore possible to generate an entire series of new anion exchangers or adsorbents directed to substances containing acidic groups such as carboxyl, phosphate and sulfate. The character of ion exchanger is most purely cultivated in acidic environment. In neutral and basic environment, as far as the transition metals are concerned, adsorption based on coordinative binding will continually dominate in proportion to the increasing pH value.

EXAMPLE 1

To 100 g of 6% agarose gel swelled in 0.5M $Na_2CO_3$, pH 11.0, in a 1 liter round flask was added 100 ml of carbonate buffer and 10 ml of divinyl sulfone. The suspension was stirred for 15 hours at room temperature and was thereafter transferred to a funnel provided with glass filter. The gel was washed with distilled water and then with the buffer according to the above.

The gel thus activated was again transferred to the round flask together with 100 ml of buffer. 0.5 g of glycine hydroxamate was added and allowed to react at 20° C. for 15 hours. The gel was washed with distilled water.

A test bed in 0.1M sodium acetate buffer, pH 5, showed that the gel had taken up 15 micromoles of trivalent iron per milliliter. The iron could not be removed with glycine solution. Nitrogen analysis on dried gel indicated a nitrogen content of 240 micromoles per gram of gel substance.

EXAMPLE 2

100 g of epoxy polyacryl amide (Eupergite) was washed with 0.5M $Na_2CO_3$ at pH 12.5, to which was added 0.5 g of glycine hydroxamate, and was allowed to react for 15 hours at room temperature. The gel was washed with distilled water. 32 micromoles of $Fe^{3+}$ was adsorbed to the gel and was not eluated with glycine. The iron could not be removed by alkali treatment followed by washing with acidic buffer solution.

The gel appeared to contain 350 micromoles of nitrogen per gram of dry gel substance.

Serum proteins were separated on an iron-containing gel produced in this manner by being contacted with the gel in a 0.05M sodium acetate solution of pH 5.5, whereafter the adsorbed proteins could be eluated by changing the pH value in the surrounding solution, or by increasing the concentration of salt in the solution.

EXAMPLE 3

35 g of cellulose in the form of filter paper was mixed in a conical flask with 43 ml of butane diol-bis-glycidyl ether and 85 ml of 0.6M NaOH containing 170 mg of $NaBH_4$. After vibration for 8 hours at 35° C., the reaction was interrupted by washing the paper pulp on glass filter with a large amount of distilled water.

Paper and paper pulp were washed with 0.1M $Na_2CO_3$, pH 12.0, and 1 g of glycyl hydroxame acid was added. After about 15 hours, the paper pulp was washed on filter with distilled water. Tests showed that heavy metal ions such as $Fe^{3+}$, $Cu^{2+}$ and $Ni^{2+}$ were absorbed by the paper and were very strongly bound.

EXAMPLE 4

In order to illustrate the preparation of a soluble α-amino acid hydroxamate derivative from a polymer, dialdehyde starch was suspended in a 0.1M sodium acetate bufer, pH 5.0, and was mixed with glycyl hydroxame acid. After 24 hours at room temperature, the starch derivative was precipitated with acetone. The precipitated starch was treated with an excess of sodium boron hydride at pH 8-10, and was again precipitated with acetone. The product was dissolved in water, dialyzed and freeze-dried.

One sample was dissolved in copper sulfate solution and another sample in ferrous chloride solution. Both samples were dialyzed against water. A colored solution was obtained in the dialyser hose in which the color did not pass through the dialyser membrane. There had thus been formed a water soluble ferrous and cupreous polymer, respectively. The method of synthesis clearly reveals that the metal ions are complex bound with hydroxamate groups.

I claim:

1. Product for adsorption of metal ions, comprising an α-amino- or α-imino-hydroxamate ligand selected from the group consisting of

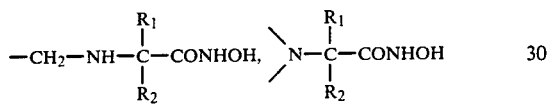

and a compound ligand having at least two hydroxamate substituents in addition to at least one α-amino or α-imino group; wherein $R_1$ and $R_2$ are hydrogen or alkyl, said ligand being covalently bound to a carrier selected from the group consisting of polysaccharides, polyacrylate and silica dioxide.

2. Product according to claim 1, wherein said carrier is cross-linked polysaccharide.

3. Product according to claim 1, wherein said carrier is a polygalactane.

4. Product according to claim 3, wherein said polygalactone is agar or agarose.

5. Product for adsorption of metal ions, comprising a ligand having at least one hydroxamate group, said ligand being selected from the group consisting of:

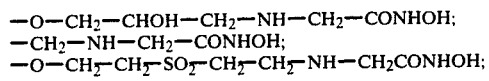

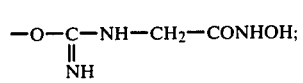

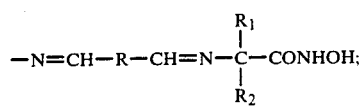

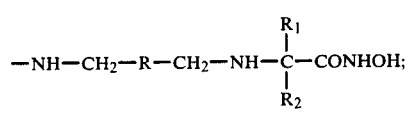

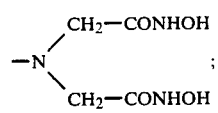

and

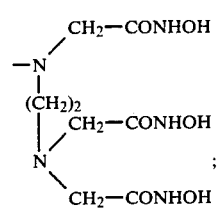

said ligand being covalently bound to a carrier selected from the group consisting of polysaccharides, polyacrylate and silica dioxide; wherein R is selected from the group consisting of hydrogen, alkyl, alkylene and aromatic; and $R_1$ and $R_2$ are hydrogen or alkyl.

* * * * *